United States Patent [19]
Juillerat et al.

[11] 3,807,223
[45] Apr. 30, 1974

[54] STRESS SENSOR WITH DIGITAL OUTPUT

[75] Inventors: Remy Juillerat; Paul Leduc, both of Paris, France

[73] Assignee: Societe Lignes Telegraphiques et Telephoniques, Paris, France

[22] Filed: Apr. 20, 1972

[21] Appl. No.: 245,979

[52] U.S. Cl.......... 73/88.5 R, 73/DIG. 2, 324/34 ST
[51] Int. Cl............................ G01b 7/18, G01l 1/22
[58] Field of Search..... 73/88.5 R, 88.5 SD, DIG. 2; 324/34 MA, 34 ST

[56] References Cited
UNITED STATES PATENTS

| | | | |
|---|---|---|---|
| 3,161,844 | 12/1964 | Kabell | 73/88.5 SD UX |
| 3,229,512 | 1/1966 | Goudswaard et al. | 73/88.5 R |
| 3,336,154 | 8/1967 | Oberg et al. | 324/34 R X |

FOREIGN PATENTS OR APPLICATIONS

| | | | |
|---|---|---|---|
| 1,297,890 | 6/1969 | Germany | 324/34 ST |

*Primary Examiner*—Charles A. Ruehl
*Attorney, Agent, or Firm*—Kemon, Palmer & Estabrook

[57] ABSTRACT

The sensor is based on the rotation of the easy axis of a thin magnetostrictive film under the stress to be measured. The sensor comprises a plurality of elementary cells located on the same substrate to which said stress is applied. Each cell comprises interrogating means and reading means associated with an elementary spot of magnetostrictive film. The angular position of the easy axis is determined through sequential interrogation of each elementary cell by means of pulsed magnetic fields as a change in the polarity of the sense pulse signal of a given elementary cell. The interrogating means is a set of lines printed according to a preset pattern which controls the coding of the binary output signal. The pulsed voltages induced in the sense circuit reverses it polarity when the interrogating field crosses the normal to the easy axis as rotated under the stress applied to the cell. The output signal conveys as a polarity reversal, the angular position information for further use. An example of use in instrumentation (pressure sensor) is described.

6 Claims, 6 Drawing Figures

STRESS SENSOR WITH DIGITAL OUTPUT

BACKGROUND OF THE INVENTION

The present invention concerns a sensor, i.e., a device for converting a physical quantity (which may be variable in the course of time) into an electric signal (which may be variable in the course of time). Known devices of the kind are generally of the analog type, the amplitude of the electric signal delivered being a monotonic function of the value of the input quantity. Operating on information in modern systems for the acquisition and processing of data, is performed on coded signals representing the analog value in accordance with a preset law, which is generally quantified. Therefor each analog sensor must be associated with an electronic analog to digital converter. Such a converter is capable of introducing conversion errors and it is relatively complex and of high cost, especially when it is necessary to obtain short conversion times, which is the case if the quantities vary rapidly.

The invention is based upon the use of the anisotropic properties of magnetostrictive origin in thin ferromagnetic layers associated with means for interrogation by a magnetic field and means for sensing the electromotive force induced by the variation of flux induced when the interrogation field vanishes.

In order that the physical phenomena serving as a basis for the present invention may be readily understood, it is necessary to recall certain properties of thin ferromagnetic layers. As is well known, these films may exhibit induced uniaxial anisotropy resulting, for example, from the conditions of manufacture. Consequently, the magnetization is in the plane of the film and parallel to the axis of anisotropy, and it may occupy two positions denoted by "0" and "1", depending upon whether its direction is the same as or opposite to that of the axis.

If the composition of the thin film is such that the coefficient of magnetostriction $\lambda_s$ is zero, the uniaxial anisotropy is independent, in magnitude and in direction, of the mechanical stresses applied to the film. This composition is in the neighbourhood of 81 percent of nickel and 19 percent of iron in the case of permalloy, as is well known.

The anisotropy energy (or internal energy as a function of the orientation) is of the form:

1. $E_1 = k_1 \sin^2\theta$, where $\theta$ is the angle between the direction of the magnetization vector and the easy axis and $k_1 = 1/2\ M_s \cdot H_k$, where
- $M_s$ = saturated magnetization,
- $H_k$ = field of anisotropy, the system employed being the CGS system.

A study of the phenomenon of induced anisotropy is made *inter alia* by Mr. Soshin Chikazumi, pages 359 et seq of his book "Physics of magnetism," published in 1964 by Willey and Son. On page 361 of this work, a definition of the constant of induced anisotropy denoted by $K_u$ is given.

Magnetic films generally possess the property of magnetostriction, that is to say, they become mechanically deformed (strained) under the action of an external magnetic field. They also show the inverse magnetostrictive effect, that is to say, a rotation of the axis of easy magnetization occurs in the film under the action of a strain. A mathematical study of this property has been made by the author already mentioned and appears on page 182 of the same work. In FIG. 1, OX is the direction of the easy axis of magnetization when no strain is applied. The direction of the stress and strain applied to the point O of the film is shown at OC, and OA is the new position of the axis of easy magnetization resulting from the application of OC. Let $\psi$ and $\theta$ be the angles OX, OC and OX, OA respectively. It is assumed that due to the elasticity of the material of the thin film and of the substrate, the stress and strain are colinear.

The anisotropy energy becomes under the conditions of FIG. 1:

2. $E = K_2 \sin^2(\phi - \theta)$ with $K_2 = 3/2\ \lambda_s \cdot \sigma$ where $\lambda_s$ = coefficient of magnetostriction at saturation, $\sigma$ = stress.

The rotation $\theta$ of the easy axis can be deduced from (1) and (2):

3. $\tan 2\theta = K_2/K_1 \sin 2\phi / 1 + K_2/K_1 \cos 2\phi$

BRIEF DISCLOSURE OF THE INVENTION

The sensor according to the invention is based upon the rotation of the easy axis of a magnetostrictive film under the action of a stress non-colinear with the easy axis, the new orientation taken by the axis of easy magnetization being detected by means of a plurality of cells situated at various points on the film as the voltage induced by the variation of the flux created by a pulsed magnetic interrogating field having a direction close to the perpendicular to the direction of the axis of easy anisotropy before the application of the stress. The various cells interrogated are distributed over the surface of the film in such manner that they each deliver under the action of a pulsed interrogation field a binary pulsed signal output whose change of state is obtained by a value of the stress peculiar to each cell. These values define the law of weighting or encoding of the binary signal supplied by the encoder.

The use of a film whose axis of induced anisotropy is at an angle $\theta = 45°$ to the direction of the stress permits writing the formula (3):

$\tan 2\theta = 3\lambda_s\sigma/M_s \cdot H_k$, which shows that, at each point interrogated, the angle of rotation of the easy axis, if very small, remains proportional to the stress. This condition is not necessary for the operation of the sensor nor for its utilization.

The interrogation with the aid of a pulsed magnetic field makes it possible to measure stresses varying rapidly in time by the use of high-frequency pulses.

The utilization of an interrogation field directed along a direction close to the normal to the direction of the easy axis, but different therefrom, makes it possible to obtain a binary output signal whose polarity varies with the angle of the interrogating line in relation to the axis. This property may be utilized in the weighting or coding of the output binary information, that is to say, to define the analog value of the stress (or of the angle of rotation of the easy axis), which produces the change of state of the binary signal of the cell being considered. FIG. 1 enables this property to be understood. OH shows the direction of the interrogation field, which is at an angle $\alpha$ to the direction OX of the easy axis in the absence of stress. In the figure, $\alpha < 90°$.

Therefore, the interrogation field has the effect of causing the easy axis to rotate through an angle smaller than 90°. When the interrogation field ceases, the easy axis returns to its initial direction OX. The sensing is non-destructive and takes place by means of the voltage induced in the sense line by the variation of flux which accompanies the return of the magnetization vector to its initial direction. After application of the stress, the easy axis is situated at OA. The angle OH, OA = $\alpha + \theta$ is larger than 90°. After disappearance of the interrogation field, the magnetization vector returns in the direction OA' opposite to OA. There is thus obtained in the sensing or output circuit a variation of flux of opposite direction, and therefore the induced voltage is of opposite polarity. The binary information has changed state in relation to the state in the absence of stress. The value of the angle $\epsilon$ ($\epsilon = 90° - \widehat{OH,OA}$) defines the threshold of the change of state of the binary information and it therefore participate in the weighting of the information supplied by the corresponding cell.

The sensor according to the present invention must necessarily be supported by a substrate, the thickness of the thin anisotropic films being of the order of a few fractions of a micrometer. The substrate transmits to the film a stress (traction or compression), of which the component coplanar to the film is measured by the sensor. The substrate may act as a stress-type converter and a stress to strain converter. It has the object of modifying the orientation of the stress so as to render it coplanar to the film. In the example which follows, a conversion of this type is utilised. It may also have a "sensitivity-monitoring" or scaling effect by establishing a known fixed ratio between the value of the stress applied to the film and that of the external stress. Finally, the substrate can provide a spatial distribution of the stress to be measured, whereby it is possible to define the law of the weighting of the items of information supplied by each of the cells of the sensor. The example which follows enables this function of the substrate to be illustrated.

The law of the weighting of the binary signal may be obtained either by a known spatial distribution of the stress over the surface of the film or by means of a variation of the orientation of the interrogation field in relation to the easy axis of the layer before stress, or by a combination of these two classes of parameters.

DETAILED DESCRIPTION OF THE INVENTION

The invention will be readily understood with reference to the following description and to the accompanying figures, which are given by way of non-limiting example of a sensor device according to the invention, and in which.

Figure 2:
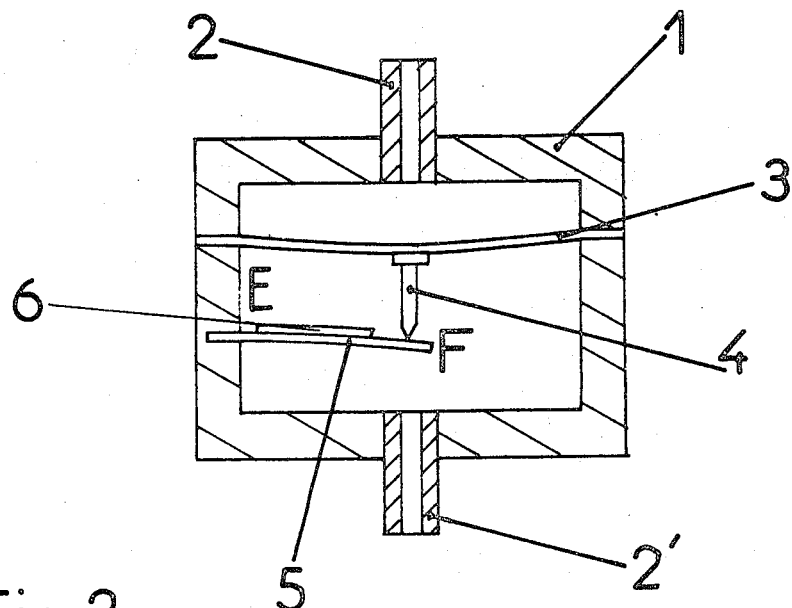
FIG. 2 illustrates diagrammatically the mechanical arrangement of a pressure sensor.

In FIG. 2, there is diagrammatically illustrated a pressure-measuring device utilizing a sensor according to the invention. It consists essentially of an enclosure 1 provided in its upper part with a pressure tap 2 and in its lower part with a valve 2'. The pressure to be measured is applied to the resilient diaphragm 3 fitted into the enclosure 1 along its periphery. The central portion of the resilient diaphragm bears through a flap 4 on the free side of a resilient plate 5 fitted into the casing at one of its ends and serving as a support for the magnetic film 6. As will readily be seen, the assembly 5–6 undergoes at each of its points a stress proportional to the force exerted by the flap 4 and also proportional to the distance between the point under consideration and the point of application of the flap to the plate 5. The coefficient of proportionality between the force exerted by 4 and that undergone by the film 6 depends upon the nature of the substrate 5, which thus performs the function of monitoring the sensitivity of the sensor. The distribution of the stresses over the surface of the thin film 6 is cuch that it effects the weighting of the bits of information supplied by each of the cells if care is taken to locate them with precision, for instance along a straight line which is non-parallel to the fitting line to the extent that the range of the measurement to be effected makes it possible to accept a linear weighting. The substrate therefore here also performs a "weighting" function or coding. In most cases it is necessary to combine the weighting effect produced by the spatial distribution of the stresses with that produced by variation of the angle of the interrogation field (or line) with the direction of the easy axis in the absence of stress, as has been mentioned.

Figure 3:
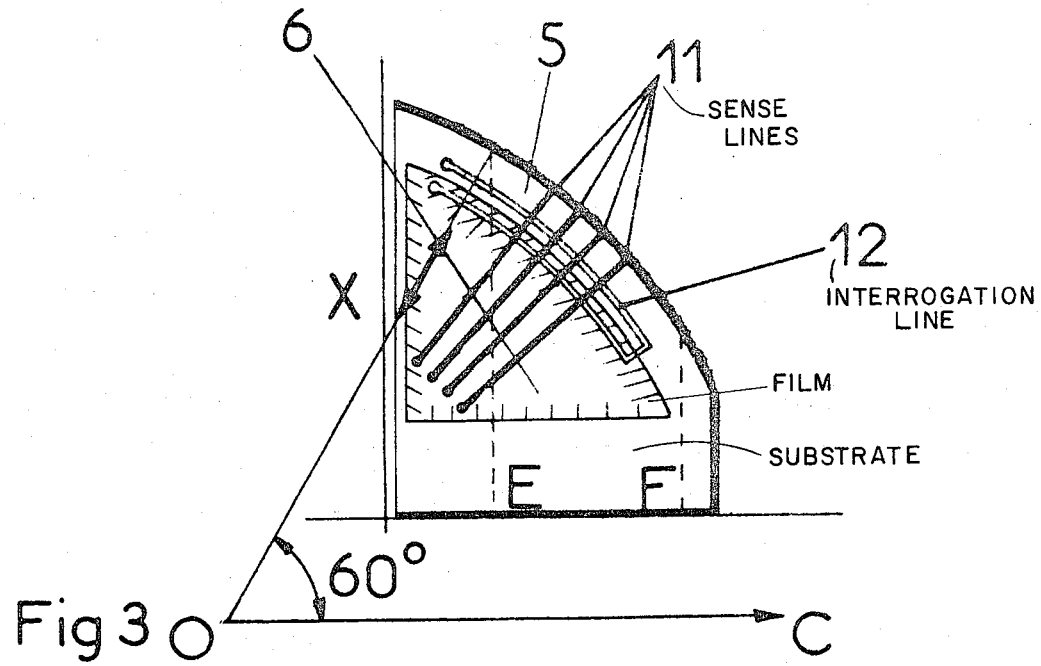
FIG. 3 is a view from above the magnetic film and of the associated printed circuits constituting the assembly of cells.

In a particular embodiment of the invention, a distance of 33 mm is available between the fitting line E and the line of application F of the force exerted by 4 (cf FIG. 3). The substrate is a glass strip of 0.1 mm thick. When the displacement is 1 mm, at F a strain of 1.38 $10^{-4}$ mm is obtained at the fitting line E.

The characteristics of the magnetic layer employed are the following:

- anisotropy field: 3 oersteds
- saturated magnetization: 800 gauss
- coefficient of magnetostriction: 1.7 $10^{-6}$ Under these conditions, a rotation of the easy axis through 15° is obtained at the fitting point and through 8° half-way between the line of application F of the force and the fitting line E.

FIG. 3 is a view from above of the film 6. The thin film 6 of magnetic material is obtained as described in U.S. Pat. No. 3,547,694 filed Dec. 4, 1967 by J.P. Dumas and P. Leduc. The films thus obtained show a higher sensitivity of rotation of the easy axis with strain than permalloy films. The magnetostrictive coefficient is set at the proper value by control of the Ni Fe ratio as shown in the curves and table page 172 in the previously mentioned book by Chikazumi. Conductors 11 constituting the interrogation lines and a hairpin conductor 12 constituting the sense line, roughly perpendicular to the interrogating lines are obtained through the etching processes used in the printed circuit art. The conductive plating serving to close the electric circuits of the lines 11 does not appear in the figure, because it is concealed by the magnetic film 6. The magnetic film is interrupted between the two arms of the hairpin in such manner that the rotation of the elements situated on one of the arms induces the sense or output signal, while the other arm is intended to produce the signals for compensating for inductive or capacitive stray effects.

As is illustrated, the sense line 12 is common to the different cells each of which is located at the crossing points of the interrogation and sense lines and comprises the zone of magnetic material situated beneath these crossings. As is well known, insulating films are disposed between the lines and above the film 6 in such manner as to avoid short-circuiting. In the figure, four cells are shown. It is obvious that the number of cells depends upon the measuring precision which it is desired to obtain. The figure shows the direction OC of the stress and the direction OX of the easy axis under zero stress, and at E and F the fitting and stress-application lines. The interrogation line for the cell closest to the fitting line is at 3° from the easy axis under zero stress in order to take account of the maximum values of the dispersion of the easy axis in the film and the error of determination regarding the direction of the lines 11. The magnetic film is located on the resilient substrate in such manner that the easy axis, in the absence of stress, is at an angle of 60° thereto. This is a particular value corresponding to a particular embodiment. For a given stress applied in the direction of F, the elongation decreases linearly when the distance from the fitting line increases. The rotation of the easy axis is a decreasing function of the distance from the fitting line. The weighting of the stresses is thereby obtained and the interrogation lines are in parallel directions to one another the cells being at different distances from the fitting line. It is possible to modify the weighting law of the binary items of information delivered by the sensor by using non-parallel interrogation lines and thus obtaining a linear law between stress and rotation angle or any other law which will better match the user's requirements. By using a wide-band differential amplifier connected through a flexible line to the ends of the sense hairpin, a differential sensing system is obtained, which permits of eliminating the stray effects resulting from the coupling between the interrogation and sense lines. The interrogation lines are connected independently of one another to flat conductors 14 (see FIG. 4) which constitute with the return conductor earth plate a set of transmission lines.

As a variant of the design shown in FIG. 3, a seven cell sensor was built on a copper-beryllium rectangular substrate 0.10 mm thick. One side was fitted and the stress applied along a line parallel to the fitting line at 30 mm from the fitting line in a direction perpendicular to the plane of the substrate. The sense line is a hairpin line parallel to the fitting line and at 3 mm therefrom. The directions of the seven interrogation lines make 3° angles and the first is oriented so as to make a 42° angle with respect to the fitting line. The other line angles with respect to the fitting line are increasing. The easy axis makes an angle of 45° with the fitting line. When the stress is such that the set along the application line is 3 mm, the seven cells have changed the polarity of their output pulse with respect to zero stress operation. The rotation of the easy axis is 28°. To obtain a change in the polarity of the output of the first cell only, the stress applied should correspond to a 0.2 mm set. The rotation of the easy axis is 6°.

Figure 4:
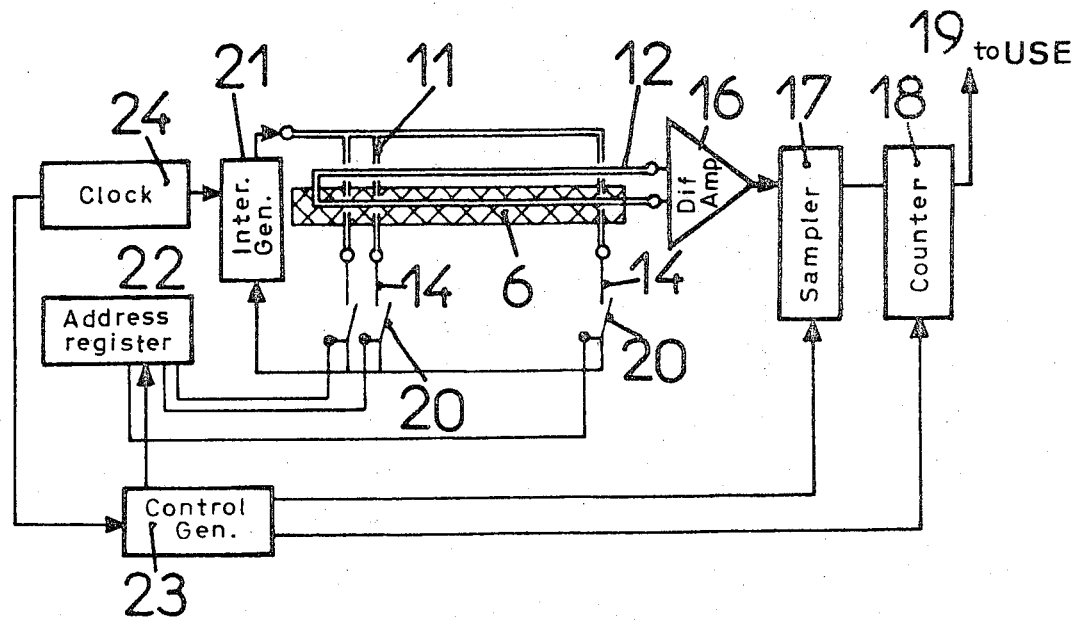
FIG. 4 illustrates the interrogation and sensing circuits associated with a cell of the sensor.
Figure 6:
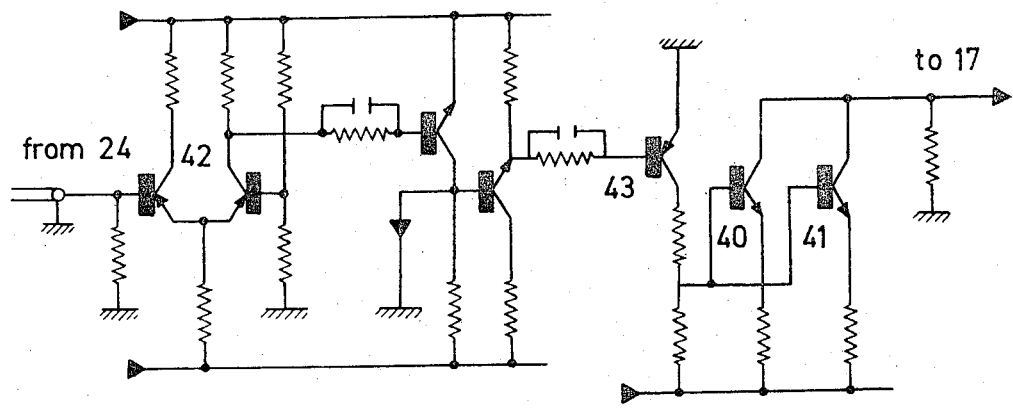
FIG. 6 is the interrogation generator.

FIG. 4 shows the block diagram of a particular embodiment of the interrogating current supply and the output circuit of a sensor according to FIGS. 2 and 3. Most of these circuits are available as integrated circuit functions. The current supply for interrogating lines 11 comprises clock 24 which is a multivibrator oscillator feeding control generator 23 made of ECL gates such as integrated circuit sold by Motorola as MC 1010. The square wave from clock 24 is fed directly into the interrogation generator 21 which is shown in detail in FIG. 6 which is essentially a two stage high level current amplifier (transistor 40 and 41) fed from a multivibrator stage 42 through a driver stage 43.

The successive closing of the contacts 20-14 corresponding to each interrogating line is obtained by successively closing transistor gates connected between each contact 20 and the associated contact 14 under the control of the address register 22 which is made of flip-flop stages (Motorola MC 1013) each stage being connected to an address gate (MC 1004) and is controlled by 23. The transistors of the gates 20-14 are 2 N 3013 with common emitter and the collector connected to successive lines 14.

The output circuit fed from the sense line consists of a differential amplifier 16 (Texas SM 5510 or Motorola MC 1509) feeding a sampler 17 comprising one gate on each output of 16 (half of a four gate integrated circuit Motorola MC 1010) feeding a RS multivibrator (integrated circuit Motorola MC 1014). This multivibrator is triggered by the control generator 23 (cf signal 32 FIG. 5). The output from 17 is counted in counter 18 which is made of a plurality of binary stages (flip-flop) designed as Motorola MC 1032 integrated circuits. The number of stages depend on the number of interrogating lines. The binary output from the counter is sent to utilization circuits such as a display, data processing circuits etc. . . . as required by the user. A return to zero signal for counter 18 is also delivered by control generator 23.

Figure 1:
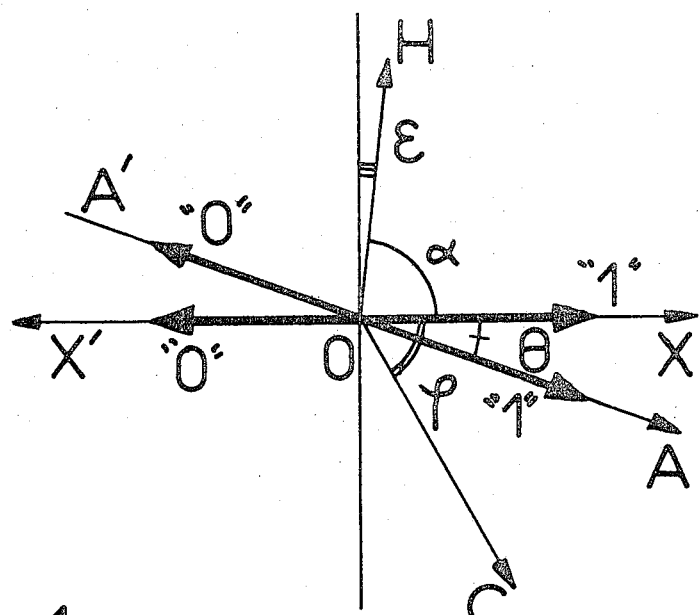
FIG. 1 is a vector diagram useful in explaining the properties of thin magnetic film subjected to mechanical stress.
Figure 5:
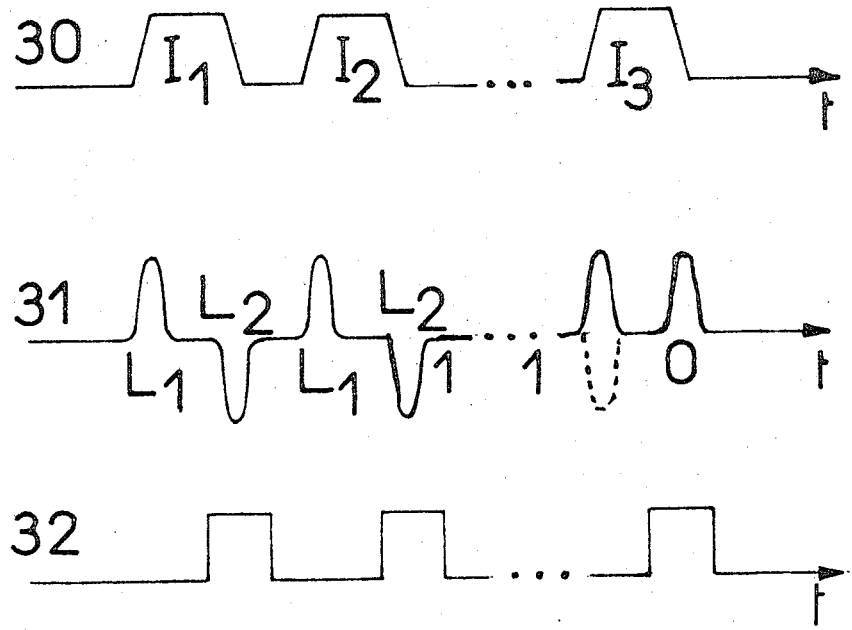
FIG. 5 is a diagram of signals, explaining the operation of the circuits.

FIG. 5 shows three curves denoted by 30, 31 and 32, which represent respectively: — 30, the interrogation field as a function of time, — 31 the sense signal on the same time scale, and 32 the control signal for controlling the sampling multivibrator 17. In the embodiment described by way of example, the duration of the pulses $I_1, I_2 \ldots I_3$ is between 20 and 30 $ns$ and the duration of the negative-going edge is about 8 $ns$. The amplitude is 450 $mA$. It will be assumed that the pulse $I_1$ is applied before the stress. The signal induced in the sense loop by the variation of the flux (by rotation of the easy axis of the film of the particular cell of the sensor which is under consideration) takes the form of two pulses of opposite polarities produced during the establishment and disappearance of the interrogation field. Regardless of the orientation of the magnetization (or easy axis) in the fourth quadrant of FIG. 1, the first pulse $L_1$ will always have the same polarity at the first sensing. The polarity of the pulse $L_2$ may vary in accordance with whether the magnetization vector returns, after interrogation, to its initial position ($\alpha + \theta < 90°$ in accordance with the notations of FIG. 1), or to the opposite direction ($\alpha + \theta > 90°$). The pulses $I_2$ and $I_3$ are applied after admission of the pressure into the enclosure 1 (see FIG. 2) and are applied to two adjacent cells $C_2$ and $C_3$. The magnetization in the cell $C_2$ has scarcely rotated, so that $\alpha + \theta_2$ remains less than 90°. On disappearance of the interrogation field, the pulse $L_2$ induced in the sensing circuit has the same polarity as in the absence of pressure. The rotation of the easy axis in the cell $C_3$ is such that $\alpha + \theta_3 > 90°$. On disappearance of the interrogation field, the easy axis will return along the direction opposite to the direction before interrogation. The corresponding pulse $L_2$ induced in the sensing circuit is of opposite polarity to that from the cell $C_2$. The sampling control signal 32 selects only the pulses $L_2$ for transmission through the sampler 17 to counter 18.

The above example concerns a pressure sensor. It is obvious that this example does not in any way constitute the only use of the sensors according to the invention. Any tensile or compressive stress applied to the substrate produces a strain of the magnetic film, which will be made available as a digital output signal by sequential interrogation of the different cells.

In a simplified form, the sensors according to the present invention may be used as threshold devices for supplying a binary signal which changes its state when the stress reaches a preset value. For this purpose, it is sufficient to provide a single cell at an appropriately chosen place on a substrate, account being taken of the mechanical conversion ratios which occur in the arrangement. Of course, under these conditions, the associated electronic circuit is greatly simplified, only the generator 21 and the amplifier 16 being necessary, as well as, in some cases, a gate to replace the sampler 17 and its control signal generator 23. Such an apparatus may serve as an alarm.

In order to increase the precision, it may be desirable to repeat the interrogations of the various cells of the sensor. In the absence of modification of the stress, the signals obtained are of the type illustrated in FIG. 5, and only the polarity of the pulse $L_1$ associated with the cell $C_3$ will be modified at the second reading. This pulse is not used as an output signal.

What we claim:

1. A stress sensing device comprising:
   a laminate including a flexible substrate and a magnetostrictive film intimately attached to said substrate;
   means for applying an external stress to the said laminate on an axis which is not co linear with the easy axis of magnetization of said film to cause rotation of said easy axis;
   interrogating means coupled to said film;
   sensing means coupled to said film and responsive to rotational changes of the easy axis of magnetization of said film;
   means for sequentially feeding interrogation pulses to said interrogating means;
   means for deriving output signals from said sensing means; and
   means for amplifying and counting said output signals.

2. A stress sensing device according to claim 1 in which said interrogating means comprise a plurality of conductive strips insulated from each other and from said magnetostrictive film and printed on said film, and said sensing means comprise a single conductive printed strip intersecting said plurality of interrogating strips.

3. A stress sensing device according to claim 2 in which said plurality of interrogating strips are in nonparallel relation to each other.

4. A stress sensing device according to claim 2 in which said sensing strip is arranged perpendicular to each one of said interrogating strips.

5. A stress sensing device according to claim 2 in which said sensing means is a hairpin shaped conductive strip, one arm of which is located on said magnetostrictive film and the other arm of which is located on a portion of said substrate extending beyond said film.

6. A pressure sensing device according to claim 1 in which said means for applying an external stress to said film comprises:
   a housing;
   a diaphragm extending across the interior of said housing;
   cantilever means mounting said laminate to a wall of said housing in generally parallel relation to the unflexed position of said diaphragm; and
   means carried by said diaphragm and bearing on said laminate; whereby fluid pressure applied to that side of said diaphragm remote from said laminate subjects said laminate to a bending stress.

* * * * *

UNITED STATES PATENT OFFICE
CERTIFICATE OF CORRECTION

Patent No. 3,807,223         Dated April 30, 1974

Inventor(s) Remy Juillerat et al

It is certified that error appears in the above-identified patent and that said Letters Patent are hereby corrected as shown below:

[30]    Foreign Application Priority Data
    April 21st, 1971    France ............... 71.14.059

Column 2 - line 46 - "$\tan 2\theta = 3\lambda_s \sigma / M_s H_k$"

Signed and sealed this 7th day of January 1975.

(SEAL)
Attest:

McCOY M. GIBSON JR.              C. MARSHALL DANN
Attesting Officer                Commissioner of Patents

UNITED STATES PATENT OFFICE
CERTIFICATE OF CORRECTION

PATENT NO. : 3,807,223
DATED : April 30, 1974
INVENTOR(S) : Remy Juillerat; Paul Leduc It is certified that error appears in the above-identified patent and that said Letters Patent are hereby corrected as shown below:

After "[73] Assignee: Societe Lignes Telegraphiques et Telephoniques, Paris, France"

Insert --and Office National d'Etudes et de Recherches Aerospatiales--.

*Signed and Sealed this*

*seventeenth* Day of *February 1976*

[SEAL]

Attest:

RUTH C. MASON
*Attesting Officer*

C. MARSHALL DANN
*Commissioner of Patents and Trademarks*